US007171343B2

(12) United States Patent
Walster et al.

(10) Patent No.: US 7,171,343 B2
(45) Date of Patent: Jan. 30, 2007

(54) COMPUTING INTERVAL PARAMETER BOUNDS FROM FALLIBLE MEASUREMENTS USING SYSTEMS OF NONLINEAR EQUATIONS

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 708 days.

(21) Appl. No.: 10/620,973

(22) Filed: Jul. 15, 2003

(65) Prior Publication Data

US 2004/0015531 A1    Jan. 22, 2004

Related U.S. Application Data

(60) Provisional application No. 60/396,246, filed on Jul. 16, 2002.

(51) Int. Cl.
*G06F 7/60* (2006.01)
(52) U.S. Cl. .......................................................... 703/2
(58) Field of Classification Search .................. 703/2
See application file for complete search history.

(56) References Cited

OTHER PUBLICATIONS

Author unknown; Interval Arithmetic in High Performance Technical Computing; Sun Microsystems White Paper obtained from Assignee's website; pp. 1-6, 2002.*
Walster; Interval and HPC; slides presented Nov. 4, 2000, pp. 1-21.*

Publication: "Design, implementation and evaluation of the constraint language cc (FD)" by Pascal Van Hentenryck et al., The Journal of Logic Programming 37, 1998, pp. 139-164.
E.R. Hansen, "Global Optimization Using Interval Analysis," Marcel Dekker, Inc., New York, NY, 1992.
R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.
R. B. Kearfott, Algorithm 763: Interval Arithmetic: A Fortran 90 Module for an Interval Data Type, ACM Trans. Math. Software, 22, vol. 4, 1996, pp. 385-392. http://interval.louisiana.edu/preprints.html.
R. B. Kearfott and M. Novoa III, "Algorithm 681: INTBIS, A portable interval Newton/bisection package", ACM Trans. Math Software, vol. 16, No. 2, pp. 152-147, http://www.netlib.org/toms/681, no date.
R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447-458.

(Continued)

*Primary Examiner*—Hugh Jones
(74) *Attorney, Agent, or Firm*—Park, Vaughan & Fleming, LLP

(57) ABSTRACT

One embodiment of the present invention provides a system that computes interval parameter bounds from fallible measurements. During operation, the system receives a set of measurements $z_1, \ldots, z_n$, wherein an observation model describes each $z_i$ as a function of a p-element vector parameter $x=(x_1, \ldots, x_p)$. Next, the system forms a system of nonlinear equations $z_i-h(x)=0$ ($i=1, \ldots, n$) based on the observation model. Finally, the system solves the system of nonlinear equations to determine interval parameter bounds on x.

27 Claims, 6 Drawing Sheets

OTHER PUBLICATIONS

R. B. Kearfott and G.W. Walster, "On Stopping Criteria in Verified Nonlinear Systems or Optimization Algorithms," ACM Trans. Math. Software, 26, vol. 3, Sep. 2000, pp. 323-351. The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051-1065.

A. Neumaier, "The Enclosure of Solutions of Parameter-Dependent Systems of Euqations," Cambridge University Press, Cambridge, 1990, ISBN: 0-12-505630-3, Reliability in Computing pp. 269-286.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Mathematics, Elsevier, 1994, pp. 63-136.

* cited by examiner $X \equiv [\underline{x}, \bar{x}] \equiv \{x \in \Re^* | \underline{x} \leq x \leq \bar{x}\}$ $Y \equiv [\underline{y}, \bar{y}] \equiv \{y \in \Re^* | \underline{y} \leq y \leq \bar{y}\}$ (1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X / Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \Re^*$, if $0 \in Y$

FIG. 5

COMPUTING INTERVAL PARAMETER BOUNDS FROM FALLIBLE MEASUREMENTS USING SYSTEMS OF NONLINEAR EQUATIONS

RELATED APPLICATIONS

This application hereby claims priority under 35 U.S.C. §119 to U.S. Provisional Patent Application No. 60/396,246, filed on 16 Jul. 2002, entitled, "Overdetermined (Tall) Systems of Nonlinear Equations," by inventors G. William Walster and Eldon R. Hansen.

BACKGROUND

1. Field of the Invention

The present invention relates to techniques for performing arithmetic operations involving interval operands within a computer system. More specifically, the present invention relates to a method and an apparatus for computing interval parameter bounds from fallible measurements using systems of nonlinear equations.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. Also note that the infimum and the supremum can be represented by floating point numbers.)

One commonly performed operation is to compute bounds on nonlinear parameters from a set of fallible measurements. Using the traditionally accepted methodology to compute approximate parameter values from nonlinear models of observable data requires a number of questionable assumptions. In the best case, if all assumptions are satisfied, the final result is a less than 100% statistical confidence interval rather than a containing interval bound. For example, the method of least squares produces a solution approximation even when the data on which it is based are inconsistent.

Hence, what is needed is a method and an apparatus that uses interval techniques to compute bounds on nonlinear parameters from fallible measurements.

SUMMARY

One embodiment of the present invention provides a system that computes interval parameter bounds from fallible measurements. During operation, the system receives a set of measurements $z_1, \ldots, z_n$, wherein an observation model describes each $z_i$ as a function of a p-element vector parameter $x=(x_1, \ldots, x_p)$. Next, the system forms a system of nonlinear equations $z_i - h(x) = 0$ ($i=1, \ldots, n$) based on the observation model. Finally, the system solves the system of nonlinear equations to determine interval parameter bounds on x.

In a variation on this embodiment, the system of nonlinear equations is an "overdetermined system" in which there are more equations than unknowns.

In a variation on this embodiment, each measurement $z_i$ is actually a q-element vector of measurements $z_i = (z_{i1}, \ldots, z_{iq})^T$, and h is actually a q-element vector of functions $h = (h_1, \ldots, h_q)^T$.

In a variation on this embodiment, receiving the set of measurements involves receiving values for a set of conditions $c_1, \ldots, c_n$ under which the corresponding observations $z_i$ were made. In this variation, the system of nonlinear equations is of the form $z_i - h(x|c_i) = 0$ ($i=1, \ldots, n$).

In a further variation, each condition $c_i$ is actually an r-element vector of conditions $c_i = (c_{i1}, \ldots, c_{ir})^T$.

In a further variation, each condition $c_i$ is not known precisely but is contained within an interval $c^I_i$.

In a variation on this embodiment, equations in the system of nonlinear equations are of the form $z_i - h(x|c_i) + \epsilon^I(x, c_i) = 0$ ($i=1, \ldots, n$), which includes an error model $\epsilon^I(x, c_i)$ that provides interval bounds on measurement errors for $z_i$.

In a further variation, if $z_i$ is actually a q-element vector of measurements $z_i = (z_{i1}, \ldots, z_{iq})^T$, then $\epsilon^I$ is actually a q-element vector $\epsilon^I = (\epsilon_1, \ldots, \epsilon_q)^T$.

In a further variation, if there exists no solution to the system of nonlinear equations, the system determines that at least one of the following is true: (1) at least one of the set of measurements $z_i, \ldots, z_n$ is faulty; (2) the observation model $h(x|c_i)$ is false; (3) the error model $\epsilon^I(x, c_i)$ is false; and (4) the computational system used to compute interval bounds on elements of x is flawed.

In a variation on this embodiment, solving the system of nonlinear equations involves first linearizing the system of nonlinear equations to form a corresponding system of linear equations, and then solving the system of linear equations through Gaussian elimination.

BRIEF DESCRIPTION OF THE FIGURES

FIG. 5 illustrates four different interval operations in accordance with an embodiment of the present invention.

Table 1 (located near the near the end of the specification—not with the figures) illustrates a correspondence between parameter estimation and nonlinear equations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
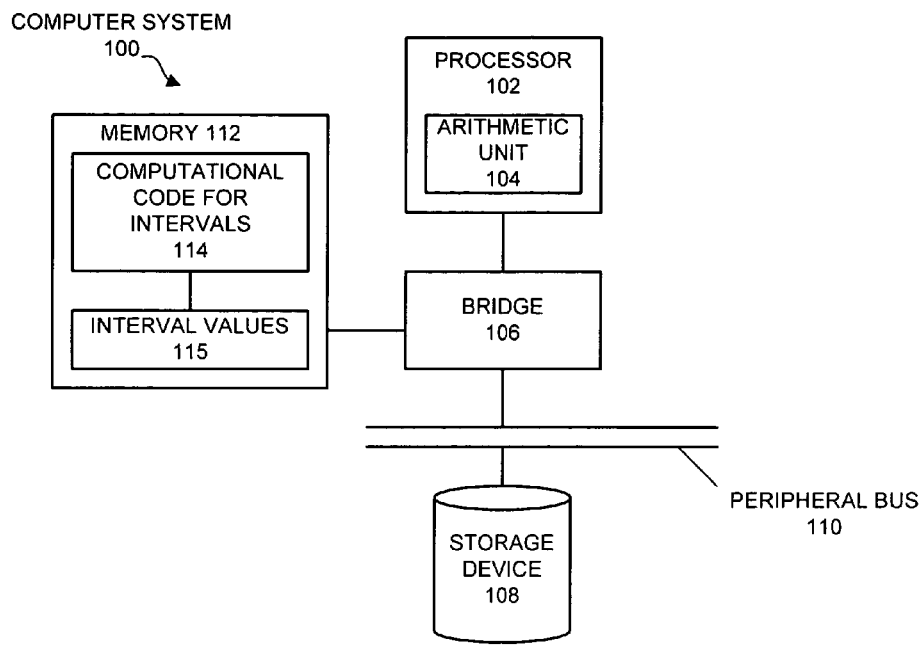
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106. and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrates in FIG. 1.

Compiling and Using Interval Code

Figure 2:
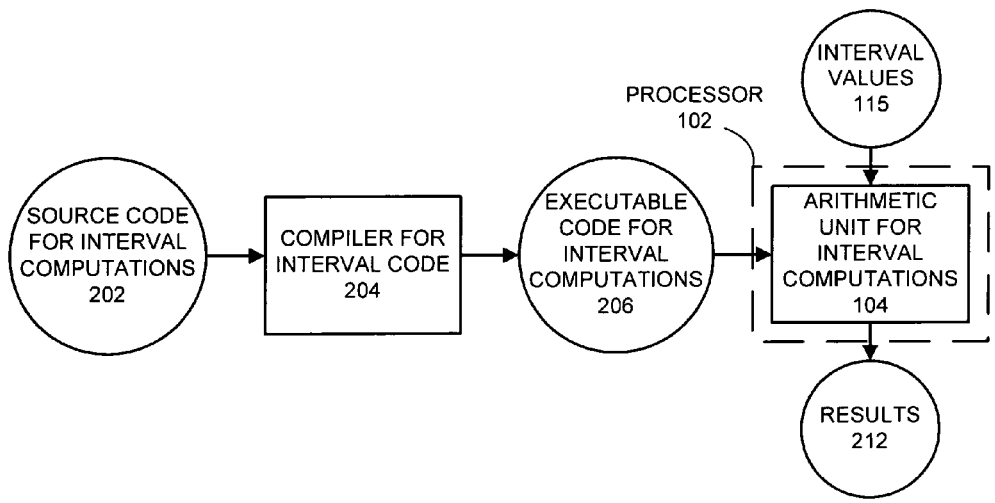
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
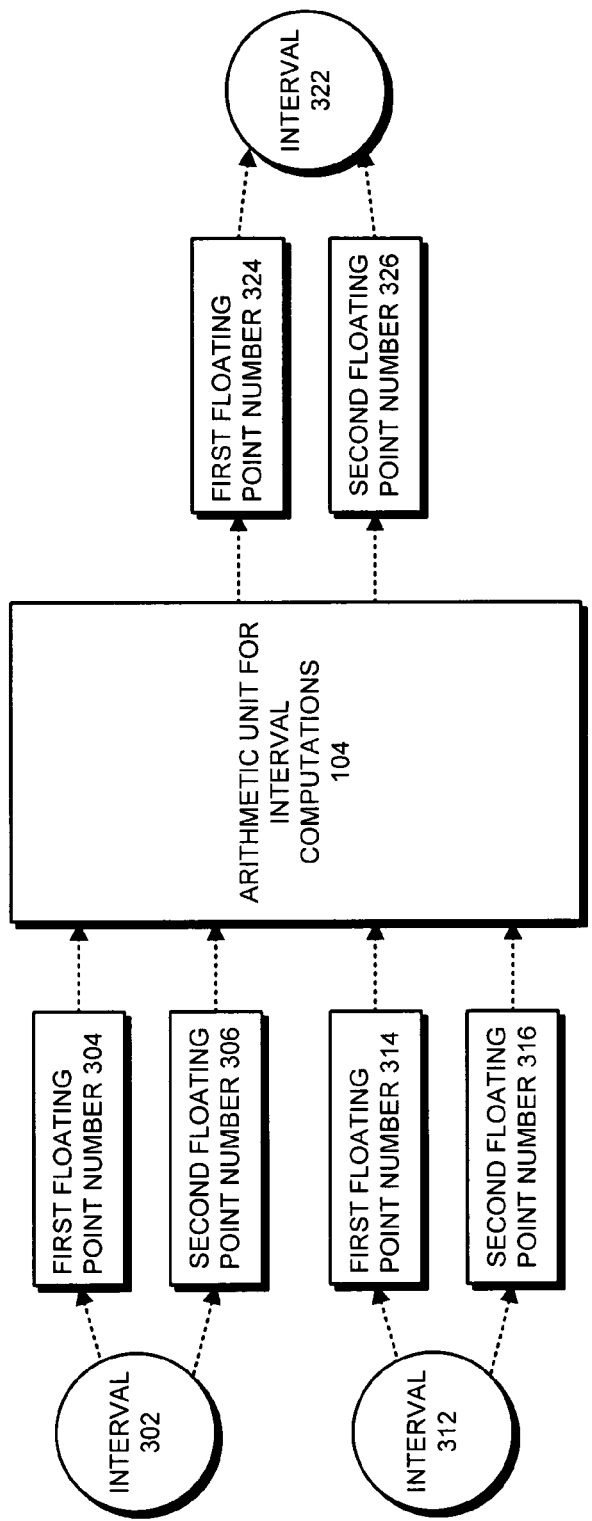
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
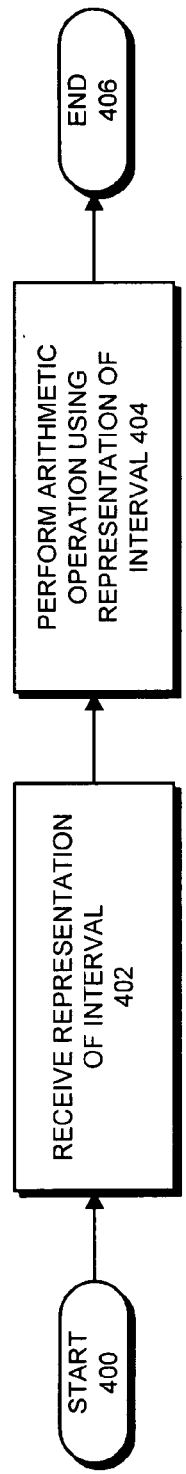
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, x denotes the lower bound of X, and x̄ denotes the upper bound of X.

The interval X is a closed subset of the extended (including $-\infty$ and $+\infty$) system of real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = (R \cup \{-\infty\}) \cup \{+\infty\} = [-\infty, +\infty].$$

We also define R** by replacing the unsigned zero, {0}, from R* with the interval [−0,+0].

$$R^{**} = R^* - \{0\} \cup [-0,+0] = [-\infty,+\infty], \text{ because } 0 = [-0,+0].$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Solving an Overdetermined System of Interval Linear Equations

In order to solve a system of interval nonlinear equations, we first describe a technique for solving a system of interval linear equations. We can subsequently use this technique in solving a corresponding system of interval nonlinear equations.

Given the real (n×n) matrix A and the (n×1) column vector b, the linear system of equations $$Ax = b \tag{1}$$

is consistent if there is a unique (n×1) vector x for which the system in (1) is satisfied. If the number of rows in A and elements in b is m≠n, then the system is said to be either under- or overdetermined depending on whether m<n or n<m. In the overdetermined case, if m−n equations are not linearly dependent on the remaining equations, there is no solution vector x that satisfies the system. In the underdetermined case there is no unique solution.

In the point (non-interval) case, there is no generally reliable way to decide if an overdetermined system based on fallible observations is consistent or not. Instead a least squares solution is generally sought. In the interval case, if the system of equations is sufficiently inconsistent, the computed interval solution set will be empty. If there are at least some parameter values that are consistent with all the observations, it is possible to delete inconsistent parameter values and bound the consistent ones.

We now consider the problem of solving overdetermined systems of equations in which the coefficients are intervals. That is, we consider a system of the form $$A^I x = b^I \tag{2}$$

where $A^I$ is an interval matrix of m rows and n columns with m>n. The interval vector $b^I$ has m components. Such a system might arise directly or by linearizing an overdetermined system of nonlinear equations. (Note that within this specification and in the following claims, we sometimes drop the superscript "I" when referring the interval matrices or vectors.)

The solution set of (2) is the set of vectors x for which there exists a real matrix $A \in A^I$ and a real vector $b \in b^I$ such that (1) is satisfied. In general, the system in (2) is inconsistent if its solution set is empty. First, we assume that there exists at least one $A \in A^I$ and $b \in b^I$ such that (1) is consistent. Later, we consider the inconsistent case. Moreover, we also assume that the data in $A^I$ and $b^I$ are fallible. That is, there exists at least one $A \in A^I$ and $b \in b^I$ such that (1) is inconsistent. Our goal is to implicitly exclude values of x that are inconsistent with all $A \in A^I$ and $b \in b^I$. For example, the redundancy resulting from the fact that there are more equations than variables might be deliberately introduced to sharpen the interval bound on the set of solutions to (2). In a following section, we show how this sharpening is accomplished.

We shall simplify the system using Gaussian elimination. In the point case, it is good practice to avoid forming normal equations from the original system. Instead, one performs elimination using normal operation matrices to zero all elements of the coefficient matrix except for an upper triangle. After this first phase, the normal equations of this simpler system can be formed and solved. Our procedure begins with a phase similar to the first phase just described. However, we do not quite complete the usual elimination procedure. We have no motivation to use normal operations because we do not form the normal equations. This is just as well because interval normal matrices do not exist.

When using interval Gaussian elimination, it is generally necessary to precondition the system to avoid excessive widening of intervals due to dependence. In the following section, we show how preconditioning can be done in the present case where $A^I$ is not square.

Preconditioning

Preconditioning can be done in the same way it is done when $A^I$ is square. Let $A_c$ denote the center of the interval matrix $A^I$. Partition $A_c$ as $$A_c = \begin{bmatrix} A'_c \\ A''_c \end{bmatrix} \quad (3)$$

where $A_c'$ is an n by n matrix and $A_c''$ is an m-n by n matrix. Note that $A_c$ need only be an approximation for the center of $A^I$. Define the partitioned square matrix $$C = \begin{bmatrix} A'_c & 0 \\ A''_c & I \end{bmatrix} \quad (4)$$

where I denotes the identity matrix of order m-n, and the block denoted by 0 is an n×m-n matrix of zeros.

Define the preconditioning matrix B to be an approximation for the inverse $$\begin{bmatrix} (A'_c)^{-1} & 0 \\ A''_c(A'_c)^{-1} & I \end{bmatrix}$$

of C.

To precondition (2) we multiply by B. We obtain $$M^I x = r^I \quad (5)$$

where $M^I = BA^I$ is an m by n interval matrix and $r^I = Bb^I$ is an interval vector of m components. When computing $M^I$ and $r^I$, we use interval arithmetic to bound rounding errors.

Elimination

We now perform elimination. We apply an interval version of Gaussian elimination to the system $M^I x = r^I$ thereby transforming $M^I$ into almost (see below) upper trapezoidal form. We assume that this procedure only fails when all possible pivot elements contain zero. Note that after preconditioning, no pivot selection is performed during the elimination to obtain a result with the form $$\begin{bmatrix} T^I \\ W^I \end{bmatrix} x = \begin{bmatrix} u^I \\ v^I \end{bmatrix} \quad (6)$$

where $T^I$ is a square upper triangular interval matrix of order n, and both $u^I$ and $v^I$ are interval vectors of n and m-n components, respectively. The submatrix $W^I$ is a matrix of m-n rows and n columns. It is zero except in the last column. Therefore, we can represent it in the form $$W^I = [0 z^I]$$

where 0 denotes an m-n by n-1 block of zeros, and $z^I$ is a vector of m-n intervals. From (6), we now have a set of equations $$z_i x_n = v_i (i=1, \ldots, m-n). \quad (7)$$

Also, $$T_{nn} x_n = u_n. \quad (8)$$

Therefore, the unknown value $x_n$ is contained in the interval $$x_n = \frac{u_n}{T_{nn}} \bigcap_{i=1}^{m-n} \frac{v_i}{z_i}. \quad (9)$$

Taking this intersection is what implicitly eliminates fallible data from $A^I$ and $b^I$. It is this operation that allows us to get a sharper bound on the set of solutions to the original system (2) than might otherwise be obtained.

If the original system contains at least one consistent set of equations, the intersection in (9) will not be empty. Knowing $x_n$ we can backsolve (6) for $x_{n-1}, \ldots, x_i$. From (6), this takes the standard form of backsolving a triangular system $T^I x = u^I$. Sharpening $x_n$ using (9) also produces sharper bounds $x^I$ on the other components of x when we backsolve.

Inconsistency

Now suppose the initial equations (2) are not consistent. Then the preconditions of equations (7) might or might not be consistent. Widening of intervals due to dependence and roundoff can cause the intersection in (9) to be non-empty.

Nevertheless, suppose we find that the intersection in (9) is empty. This event proves that the original equations (2) are inconsistent. Proving inconsistency might be the signal that a theory is measurably false, which might be an extremely enlightening event. On the other hand, inconsistency might only mean that invalid measurements have been made.

If invalid measurements are suspected, it might be important to discover which equation(s) in (2) are inconsistent. We might know which equation(s) in the transformed system (6)

must be eliminated to obtain consistency. However, an equation in (6) is generally a linear combination of all the original equations in (2). Therefore, to establish consistency in the original system, we generally cannot determine which of its equation(s) to remove.

We might be able to determine a likely removal candidate by using the following steps:

1. Remove enough equations from (6) that the intersection in (9) is not empty.
2. Solve (6) for $x_{n-1}, \ldots, x_1$. This process cannot fail because we assume the elimination process to obtain (6) does not fail.
3. Substitute the solution into the original system (2). Any equation(s) in (2) whose left and right members do not intersect can be discarded.

Summary of the Gaussian Elimination Operation

Figure 6:
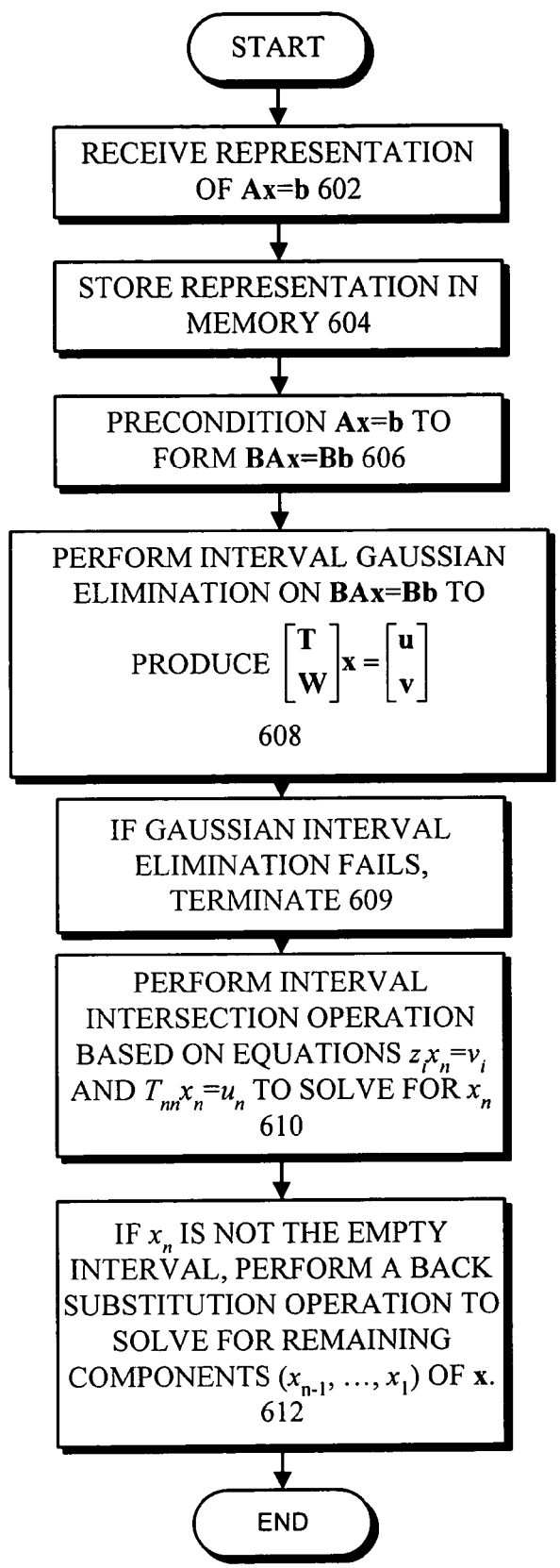
FIG. 6 illustrates the process of performing a Gaussian Elimination operation on an overdetermined interval system of linear equations in accordance with an embodiment of the present invention.

FIG. 6 illustrates the process of performing a Gaussian Elimination operation on an overdetermined interval system of linear equations in accordance with an embodiment of the present invention. The system starts by receiving a representation of the overdetermined system of linear equations $Ax=b$ (step 602). In this representation, A is a matrix with m rows corresponding to m equations and n columns corresponding to n variables, x includes n variable components, b includes m scalar components, and $m>n$. The system then stores this representation in memory (step 604).

Next, the system preconditions $Ax=b$ to generate a modified system $BAx=Bb$ that can be solved with reduced growth of interval widths (step 606). This preconditioning process is described in more detail below with reference to FIG. 7.

The system then performs an interval Gaussian elimination operation on $BAx=Bb$ to form $$\begin{bmatrix} T \\ W \end{bmatrix} x = \begin{bmatrix} u \\ v \end{bmatrix},$$

wherein T is a square upper triangular matrix of order n, u is an interval vector with n components, v is an interval vector with m−n components, and W is a matrix with m−n rows and n columns, and wherein W is zero except in the last column, which is represented as a column vector z with m−n components (step 608).

Note that interval Gaussian elimination can fail. If so, the system simply terminates (step 609).

If Gaussian elimination does not fail, the system performs an interval intersection operation based on the equations $z_i x_n = v_i (i=1, \ldots, m-n)$ and $T_{nn} x_n = u_n$ to solve for $$x_n = \frac{u_n}{T_{nn}} \bigcap_{i=1}^{m-n} \frac{v_i}{z_i}$$

(step 610).

Finally, if $x_n$ is not the empty interval, the system performs a back substitution operation using $x_n$ and $Tx=u$ to solve for the remaining components $(x_{n-1}, \ldots, x_1)$ of x (step 612).

Figure 7:
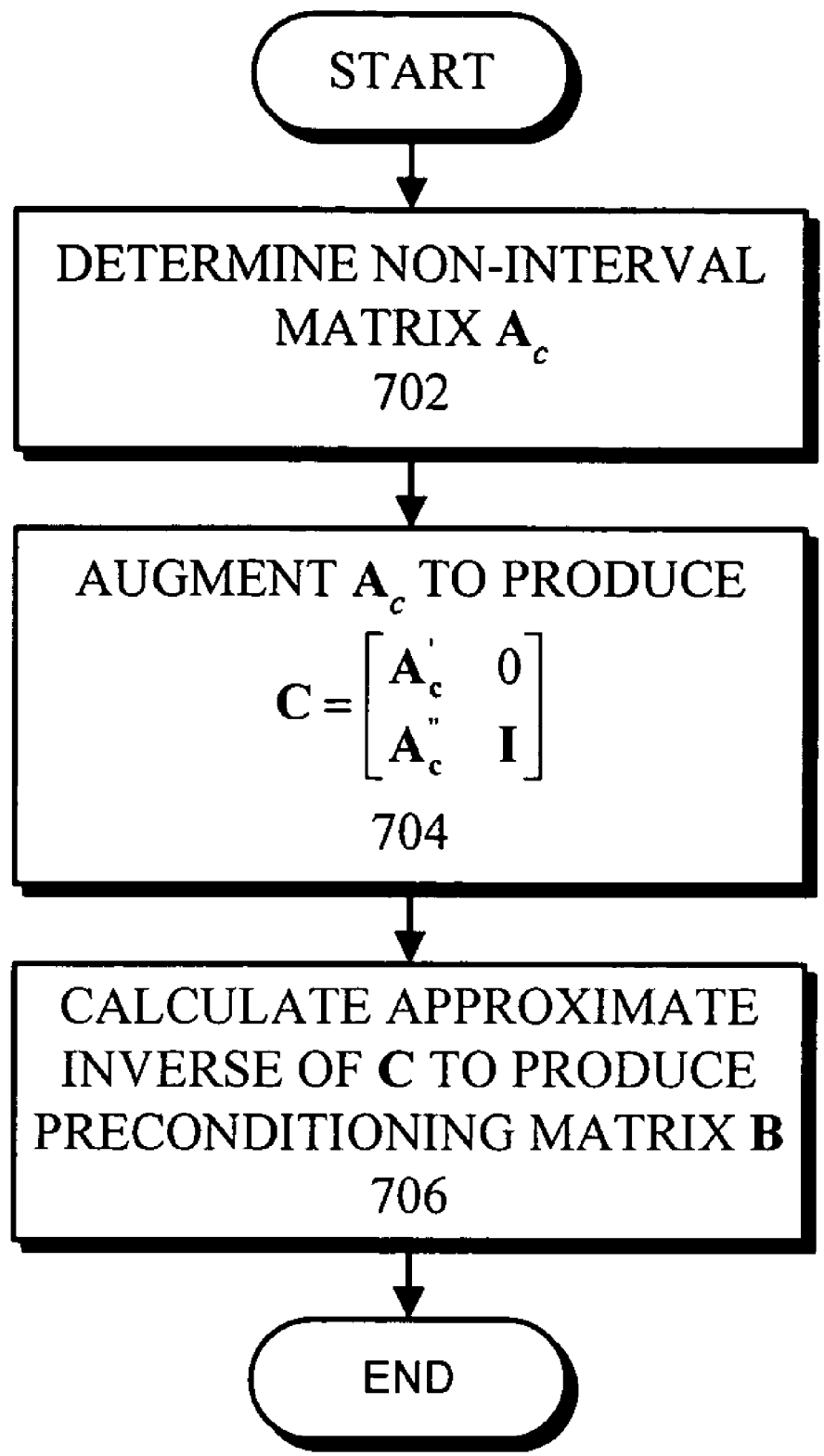
FIG. 7 illustrates the process of generating a preconditioning matrix in accordance with an embodiment of the present invention.

FIG. 7 illustrates the process of generating a preconditioning matrix in accordance with an embodiment of the present invention. The system starts by determining a non-interval matrix $A_c$, which is the approximate center of the interval matrix A (step 702). Next, the system augments the m×n matrix $A_c$ to produce an n×n partitioned matrix $$C = \begin{bmatrix} A'_c & 0 \\ A''_c & I \end{bmatrix},$$

wherein $A_c'$ is an n×n matrix, $A_c''$ is an m−n×n matrix, I is the identity matrix of order m−n, and 0 is an n×m−n matrix of zeros (step 704). Finally, the system calculates the approximate inverse of the partitioned matrix C to produce the preconditioning matrix B (step 706). If C happens to be singular, its elements can be perturbed until it is no longer so. This causes no difficulty because C is just used to compute the approximate inverse B.

Parameter Estimation in Nonlinear Models

Overdetermined (tall) systems of nonlinear equations naturally arise in the context of computing interval parameter bounds from fallible data. In tall systems, there are more interval equations than unknowns. As a result, these systems can appear to be inconsistent when they are not. A technique is described to compute interval nonlinear parameter bounds from fallible data and to possibly prove that no bounds exist because the tall system is inconsistent.

Interval arithmetic has been used to perform the analysis of fallible observations from an experiment to compute bounds on Newton's constant of gravitation G. (see B. Lang, Verified Quadrature in Determining Newton's Constant of Gravitation, *Journal of Universal Computer Science*, 4(1): 16–24, 1998.) Because the computed bounds were sufficiently different from the then accepted approximate value, subsequent experiments were conducted to refine the accepted approximate value and the interval bound on G. (see "The Controversy of Newton's Gravitational Constant," The Eöt-Wash Group: Laboratory of Gravitational Physics, www.npl.washington.edu/eotwash/gconst.html)

Using the traditionally accepted methodology to compute approximate parameter values from nonlinear models of observable data requires a number of questionable assumptions. In the best case, if all assumptions are satisfied, the final result is a less than 100% statistical confidence interval rather than a containing interval bound. For example, the method of least squares produces a solution approximation even when the data on which it is based are inconsistent.

A better procedure is to solve a system of interval nonlinear equations using the interval version of Newton's method. If assumptions for this procedure are satisfied, the result is a guaranteed bound on the parameter(s) in question. If assumptions are sufficiently violated and enough observations are available, the procedure can prove the system of equations and interval data are inconsistent. This better procedure is now described.

Nonlinear Parameter Estimation

Let n q-element vector measurements, $z_1, \ldots, z_n$ with $z_i = (z_{i1}, \ldots, z_{iq})^T$ be given. Assume these measurements depend on the value of a p-element vector parameter, $x_i = (x_1, \ldots, x_p)^T$. Moreover, assume an analytic model exists for the observation vectors, $z_i$, as a function of x and the true value $c_i = (C_{i1}, \ldots, c_{ir})^T$ of conditions under which the $z_i$ are measured. Thus:

$$z_i = h(x|c_i) \qquad (11)$$

The problem is to construct interval bounds $x^I$ on the elements of x from interval bounds $z^I_i$ on the fallible measurements, $z_i$ and interval bounds $c^I_i$ on the conditions of measurement.

Interval Observation Bounds

The development of interval measurement bounds begins by recognizing that a measurement z can be modeled (or thought of) as an unknown value t to which an error is added from the interval $$\epsilon \times [-1, 1] = \epsilon^I \qquad (12)$$

where $0 \leq \epsilon$. No assumption is made about the distribution of individual measurement errors from the interval $\epsilon^I$ that are added to t in the process of measuring z.

At once it follows that $$z \in t + \epsilon^I. \qquad (13)$$

More importantly, if the interval observation Z is defined to be $z + \epsilon^I$, then $$t \in Z. \qquad (14)$$

Enclosure (14) is an immediate consequence of the fact that zero is the midpoint of $\epsilon^I$. This simple idea has a number of implications. They are:

Given multiple interval observations $Z_i$, all of which are enclosures of t, so must their intersection. Therefore $$t \in \bigcap_{i=1}^{n} Z_i.$$

Given random finite intervals $Z_i$, all of which contain the value t, the expected width of their intersection decreases as n increases.

An empty intersection is proof that $t \notin Z_i$ for some value of i. This can be true either because the width of the interval observations $Z_i$ is too narrow,
there is no single value t that is contained in all the interval measurements $Z_i$, or
both of the above.

The first alternative means that the assumption regarding the accuracy of the measurement process is false. The second alternative means that the model for the single common value t is false.

Walster explored how this simple idea works in practice to compute an interval bound on a common value under various probability distributions for values of the random variable $\epsilon \in \epsilon^I$. (see G. W. Walster, "Philosophy and Practicalities of Interval Arithmetic," R. E. Moore Editor, *Reliability on Computing*, pages 309–323, Academic Press, Inc., San Diego, Calif. 1988.) He also discussed how this estimation principle can be generalized and used to bound parameters of nonlinear models given bounded interval observations, or observation vectors. The following is a more complete elaboration of the nonlinear generalization.

General Development

Given exact values of a set of conditions $c_i = (c_{i1}, \ldots, c_{ir})^T$ under which observations $z_i = (z_{i1}, \ldots, z_{iq})^T$ are made, assume the observation vectors, $z_i$ (i=1, ..., n), satisfy the following model:

$$z_i \in h(x|c_i) + \epsilon(x, c_i) \times [-1, 1]; \qquad (15)$$

where the vectors $0 \leq \epsilon(x, c_i)$ bound unknown modeling and direct measurement errors. Specifically, if the p elements of x and the rn elements of all the $c_i$ were known (in practice they are not), assume it would be possible to compute intervals $$\epsilon^I(x, c_i) = \epsilon(x, c_i) \times [-1, 1]; \qquad (16)$$

from which it follows immediately that $$0 \in z_i - h(x|c_i) + \epsilon^I(x, c_i). \qquad (17)$$

Note that (16) is a generalization of (12), and (17) is a generalization of (14) if written in the form $0 \in Z - t$.

If (as is normally the case) the conditions $c_i$ under which measurements $z_i$ are made are not known, but are contained in intervals $c^I_i$, then taking all bounded modeling and observation errors into account:

$$0 \in z_i - h(x|c^I_i) + \epsilon^I(x, c^I_i). \qquad (18)$$

In this general form, the widths of interval measurements $z_{Ii}$ are themselves functions of both the unknown parameters x and fallibly measured conditions under which the measurements are made. That is:

$$z^I_i = z_i + \epsilon^I(x, c^I_i). \qquad (19)$$

This interval observation model is the generalization of $Z = z + \epsilon^I$ which is consistent with (13). The interval observation model (19) is needed to solve for interval bounds on the parameter vector x. If there is no solution for a given set of interval observation vectors $z^I_i$ and interval bounds on measurement conditions $c^I_i$, then either:

the observation model $h(x|c^I_i)$ is false;
the measurement error model $\epsilon^I(x, c^I_i)$ is false;
the computational system used to compute interval bounds on the elements of x is flawed; or
some combination of the above.

In this way, and by eliminating alternative explanations, the theory represented in $h(x|c^I_i)$ or the observation error model represented in $\epsilon^I(x, c^I_i)$ can be proved to be false.

The System of Nonlinear Equations

To guarantee any computed interval $x^I$ is indeed a valid bound on the true value of x, the following must be true:

the given model h;
the interval bounds $c^I_i$ on the conditions under which fallible measurements $z_i$ are made; and,
the model for interval bounds $\epsilon^I(x, c^I_i)$ on observation errors.

To be consistent with the given models, all the actual measurement vectors $z_i$ must satisfy relation (18). A logically equivalent, but more suggestive way to write this system of constraints is:

$$z_i - h(x|c^I_i) + \epsilon^I(x, c^I_i) \ni 0 (i=1, \ldots, n) \qquad (20)$$

When used in (20), a possible value of x produces intervals that contain zero for all i. Any value of x that fails to do this cannot be in the solution set of (20). Thus, (20) is just an interval system of nonlinear equations in the unknown parameter vector x. The problem is that the total number of scalar equations nq might be much larger than the number p of scalar unknowns in the parameter vector x. Point (rather than interval) systems of equations where p<nq are called "overdetermined". For interval nonlinear equations, this is a misnomer because the interval equations might or might not be consistent. As mentioned above, inconsistency (an empty solution set) is an informative event.

Solving Nonlinear Equations

Let f: $\mathbb{R}^n \to \mathbb{R}^m$ ($n \leq m$) be a continuously differentiable function. The parameter estimation problem described above is just a special case of the more general problem now considered. Table 1 below shows the correspondence between the parameter estimation problem and equivalent nonlinear equations to be solved. Both unknowns and equations are shown.

TABLE 1

Correspondence between Parameter Estimation and Nonlinear Equations

| | Parameter Estimation | Nonlinear Equations |
|---|---|---|
| Unknowns | $x^I = (x_1^I, \ldots, x_p^I)^T$ | $x^I = (X_1, \ldots, X_p)^T$ |
| Equations | $z_i - h(x \mid c_i^I) + \varepsilon^I(x, c_i^I) = 0$ (i = 1, ..., n) | $f = (f_1, \ldots, f_m)^T = 0$ where m = nq |

Having established this correspondence, the problem becomes to find and bound all the solution vectors of f(x)=0 in a given initial box $x^{I(0)}$. For non-interval methods, it can sometimes be difficult to find reasonable bounds on a single solution, quite difficult to find reasonable bounds on all solutions, and generally impossible to know whether reasonable bounds on all solutions have been found. In contrast, it is a straightforward problem to find reasonable bounds on solutions in $x^{I(0)}$ using interval methods; and it is trivially easy to computationally determine that all solutions in $x^{I(0)}$ have been bounded. What is unusual in this problem is that the order m of f can be greater than the order p of $x^I$. A factor that simplifies obtaining solution(s) is the assumption that the equations are consistent. This has the effect of reducing the number of equations at a solution to the number of variables.

Linearization and Gaussian Elimination

Let x and y be points in a box $x^I$. Suppose we expand each component $f_i$ (i=1, . . . , m) of f by one of the procedures commonly used to linearize nonlinear equations to be solved using the interval Newton method. Define the matrix of partial derivatives of the elements $f_i$ of f with respect to the elements $x_j$ (j=1, . . . , p) of x:

$$J_{ij} = \left(\frac{\partial f_i(x)}{\partial x_j}\right).$$

If n=m, the system is square, and J is the Jacobian of f. This is the usual situation in which the interval Newton method is applied. (see [Hansen] E. R. Hansen, "Global Optimization Using Interval Analysis," Marcel Dekker, Inc., New York, 1992).

In passing it is worth noting that in place of partial derivatives, slopes can be used to good advantage. Slopes have narrower width than interval bounds on derivatives and might exist when derivatives are undefined. Nevertheless, the remaining development uses derivatives as they are more familiar than slopes.

Combining the results in vector form:

$$f(y) \in f(x) + J(x, x^I)(y-x) \quad (21)$$

Even in the non-square situation, J is still referred to herein as the Jacobian of f. The notation $J(x, x^I)$ is used to emphasize the fact that a tighter expansion of f can be obtained if both point and interval values of x elements are used to compute Jacobian matrix elements (see [Hansen]).

If y is a zero of f, then f(y)=0, and (21) is replaced by, $$f(x) + J(x, x^I)(y-x) = 0. \quad (22)$$

Define the solution set of (22) to be $$s = \{y \mid f_i(x) + [J(x, x'(i))(y-x)]_i = 0, x'(i) \in x^I (i=1, \ldots, n)\}.$$

This set contains any point $y \in x^I$ for which f(y)=0.

The smaller the box $x^I$, the smaller the set s. The object of an interval Newton method is to reduce $x^I$ until s is as small as desired so that a solution point $y \in x^I$ is tightly bounded. Note that s is generally not a box.

Normally, the system of linear equations in (22) is solved using any of a variety of interval methods. In the present situation if n<m, the linear system is overdetermined and therefore appears to be inconsistent. This is not necessarily the case. If the procedure described above for interval linear equations is used to compute an interval bound $y^I$ on y, then $y^I$ contains the set of consistent solutions s.

For the solution of (22), the standard and distinctive notation $N(x, x^I)$ is used in place of $y^I$. This emphasizes the solution's dependence on both x and $x^I$.

From (22), define an iterative process of the form $$f(x) + J(x, x^I)(N(x^{(k)}, x^{I(k)}) - x) = 0 \quad (23a)$$

$$x^{I(k+1)} = x^{I(k)} \cap N(x^{(k)}, x^{I(k)}) \quad (23b)$$

for k=0,1,2, . . . where $x^{(k)}$ must be in $x^{I(k)}$. A good choice for $x^{(k)}$ is the center $m(x^{I(k)})$ of $x^{I(k)}$. For details on computing $N(x^{(k)}, x^{I(k)})$ when the system of interval linear equations appears to be overdetermined, see [Hansen].

Summary of Parameter Estimation in Nonlinear Models

Figure 8:
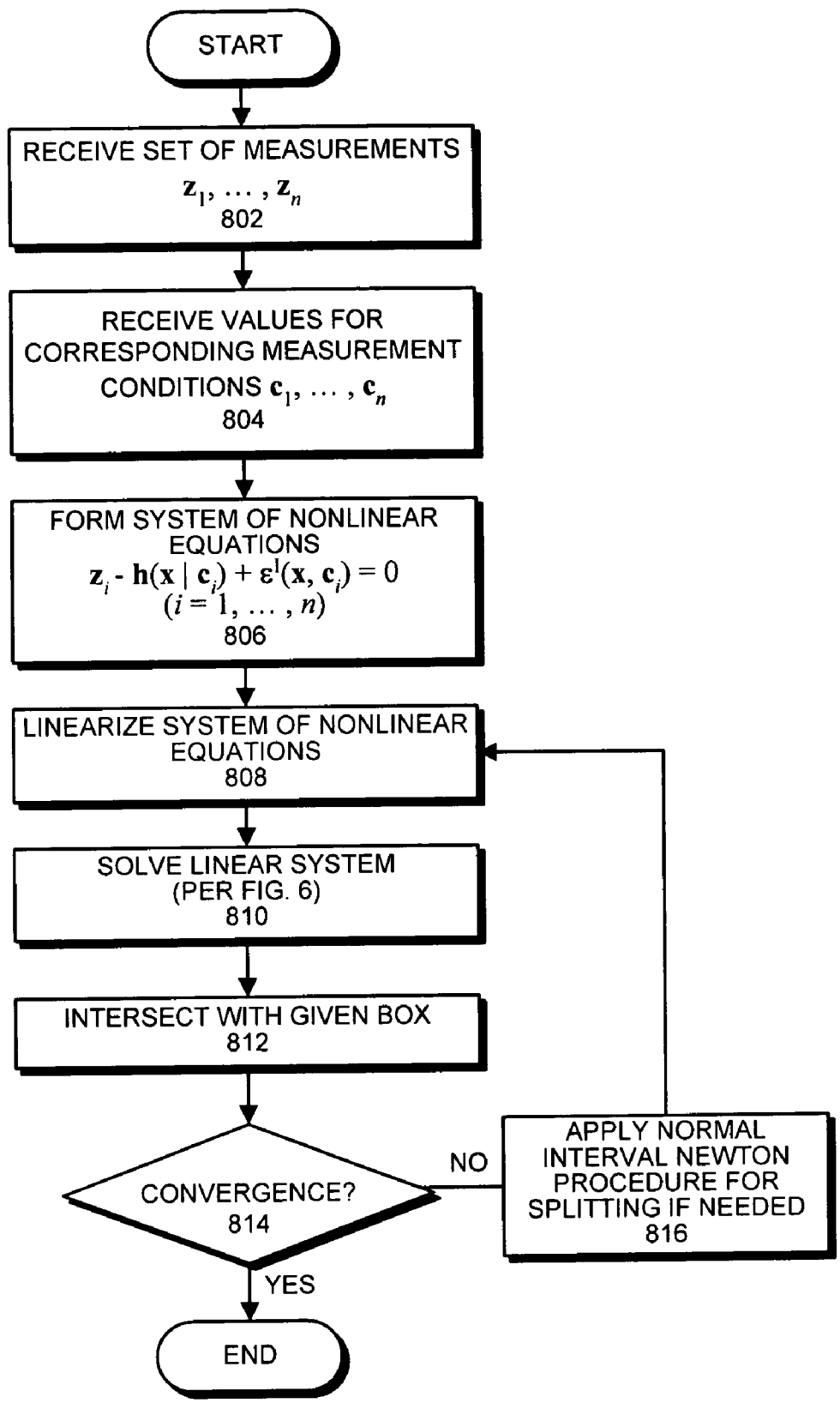
FIG. 8 presents a flow chart illustrating the process of computing interval parameter bounds from fallible measurements in accordance with an embodiment of the present invention.

FIG. 8 presents a flow chart summarizing the process of computing interval parameter bounds from fallible measurements in accordance with an embodiment of the present invention. During operation, the system receives a set of measurements $z_1, \ldots, z_n$ (step 802), as well as values for measurement conditions $c_1, \ldots, c_n$ under which the corresponding observations $z_i$ were made (step 804). Next, the system forms a system of interval nonlinear equations $z_i - h(x \mid c_i) + \varepsilon^I(x, c_i) = 0$ (i=1, . . . , n) based on a nonlinear model h and an error model $\varepsilon$ (step 806).

The system then uses standard interval Newtown techniques described above to solve the system of nonlinear equations to determine interval parameter bounds for x. More specifically, the system linearizes the system of nonlinear equations (step 808), and then solves the system of linear equations using the technique described above with reference to FIG. 6 (step 810). The system then intersects the solution with the given box (step 812). Next, the system determines if the solution has converged to be within specified tolerances (step 814). If so, the system stops. Otherwise, the system applies the interval Newton procedure for splitting if needed (step 816) and returns to step 808 to linearize the system of equations again.

Conclusion for Parameter Estimation in Nonlinear Models

Computing bounds on nonlinear parameters from fallible observations is a pervasive problem. In the presence of uncertain observations, attempting to capture uncertainty with Gaussian error distributions is problematic when nonlinear functions of observations are computed.

The procedure described in this specification uses the interval solution of a system of nonlinear equations to compute bounds on nonlinear parameters from fallible data. Among the many advantages of this approach is the ability to aggregate data from independent experiments, thereby continuously narrowing interval bounds. Whenever different interval results are inconsistent, or if the set of interval bounds from a given data set is empty, this proves an assumption is violated or the model for the observations is measurably wrong.

Narrower parameter bounds can be computed from a calibrated system. It is interesting to note that the same procedure as described above can be used to solve the calibration problem. All that must be done is to modify (8) in the following way:

replace selected unknown parameter values with their now measured bounds $x^I_i$; and solve for narrower bounds on any parameters in the model for $\epsilon^I(x, c_i)$.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer program product for computing interval parameter bounds from fallible measurements, comprising instructions for:

receiving a set of measurements $z_1, \ldots, z_n$, wherein an observation model describes each $z_i$ as a function of a p-element vector parameter $x=(x_1, \ldots, x_p)$, wherein receiving the set of measurements involves receiving values for a set of conditions $c_1, \ldots, c_n$ under which the corresponding observations $z_i$ made, wherein equations in the system of nonlinear equations account for the conditions $c_i$, and are of the form $z_i-h(x|c_i)=0$ (i=1, ..., n), and wherein each condition $c_1$ is not known precisely but is contained within an interval $c^I_i$;

storing the set of measurements $z_1, \ldots, z_n$ in a memory in a computer system;

forming a system of nonlinear equations $z_i-h(x)=0$ (i=1, ..., n) based on the observation model; and solving the system of nonlinear equations to determine interval parameter bounds on x.

2. The computer program product of claim 1, wherein the system of nonlinear equations is an "overdetermined system" in which there are more equations than unknowns.

3. The computer program product of claim 1, wherein each measurement $z_i$ is actually a q-element vector of measurements $z_i=(z_{i1}, \ldots, z_{iq})^T$, and h is actually a q-element vector of functions $h=(h_1, \ldots, h_q)^T$.

4. The computer program product of claim 1, wherein each condition $c_i$ is actually an r-element vector of conditions $c_i=(c_{i1}, \ldots, c_{ir})^T$.

5. The computer program product of claim 1, wherein equations in the system of nonlinear equations are of the form $z_i-h(x|c_i)+\epsilon^I(x, c_i)=0$ (i=1, ..., n), which includes an error model $\epsilon^I(x, c_i)$ that provides interval bounds on measurement errors for $z_i$.

6. The computer program product of claim 5, wherein if $z_i$ is actually a q-element vector of measurements $z_i=(z_{i1}, \ldots, z_{iq})^T$, then $\epsilon^I$ is actually a q-element vector $\epsilon^I=(\epsilon_1, \ldots, \epsilon_q)^T$.

7. The computer program product of claim 5, wherein if there exists no solution to the system of nonlinear equations, the method further comprises determining that at least one of the following is true:

at least one of the set of measurements $z_i, \ldots, z_n$ is faulty;

the observation model $h(x|c_i)$ is false;

the error model $\epsilon^I(x, c_i)$ is false; and the computational system used to compute interval bounds on elements of x is flawed.

8. The computer program product of claim 1, wherein solving the system of nonlinear equations involves:

linearizing the system of nonlinear equations to form a corresponding system of linear equations; and solving the system of linear equations.

9. The computer program product of claim 8, wherein solving the system of nonlinear equations involves using Gaussian Elimination.

10. A physical computer-readable storage medium storing instructions that when executed by a computer cause the computer to perform a method for computing interval parameter bounds from fallible measurements, wherein the computer-readable storage medium includes magnetic storage devices, optical storage devices, disk drives, magnetic tape. CDs (compact discs), and DVDs (digital versatile discs or digital video discs), the method comprising:

receiving a set of measurements $z_1, \ldots, z_n$, wherein an observation model describes each $z_i$ as a function of a p-element vector parameter $x=(x_1, \ldots, x_p)$, wherein receiving the set of measurements involves receiving values for a set of conditions $c_1, \ldots, c_n$ under which the corresponding observations $z_i$ were made, wherein equations in the system of nonlinear equations account for the conditions $c_i$ and are of the form $z_i-h(x|c_i)=0$ (i=1, ..., n), and wherein each condition $c_i$ is not known precisely but is contained within an interval $c^I_i$;

storing the set of measurements $z_1, \ldots, z_n$ in a memory in a computer system;

forming a system of nonlinear equations $z_i-h(x)=0$ (i=1, ..., n) based on the observation model; and solving the system of nonlinear equations to determine interval parameter bounds on x.

11. The computer-readable storage medium of claim 10, wherein the system of nonlinear equations is an "overdetermined system" in which there are more equations than unknowns.

12. The computer-readable storage medium of claim 10, wherein each measurement $z_i$ is actually a q-element vector of measurements $z_i=(z_{i1}, \ldots, z_{iq})^T$, and h is actually a q-element vector of functions $h=(h_1, \ldots, h_q)^T$.

13. The computer-readable storage medium of claim 10, wherein each condition $c_i$ is actually an r-element vector of conditions $c_i=(c_{i1}, \ldots, c_{ir})^T$.

14. The computer-readable storage medium of claim 10, wherein equations in the system of nonlinear equations are of the form, $z_i-h(x|c_i)+\epsilon^I(x, c_i)=0$ (i=1, ..., n), which includes an error model $\epsilon^I(x, c_i)$ that provides interval bounds on measurement errors for $z_i$.

15. The computer-readable storage medium of claim 14, wherein if $z_i$ is actually a q-element vector of measurements $z_i=(z_{i1}, \ldots, z_{iq})^T$, then $\epsilon^I$ is actually a q-element vector $\epsilon^I=(\epsilon_1, \ldots, \epsilon_q)^T$.

16. The computer-readable storage medium of claim 14, wherein if there exists no solution to the system of nonlinear equations, the method further comprises determining that at least one of the following is true:

at least one of the set of measurements $z_i, \ldots, z_n$ is faulty;

the observation model $h(x|c_i)$ is false;

the error model $\epsilon^I(x, c_i)$ is false; and the computational system used to compute interval bounds on elements of x is flawed.

17. The computer-readable storage medium of claim 10, wherein solving the system of nonlinear equations involves:

linearizing the system of nonlinear equations to form a corresponding system of linear equations; and solving the system of linear equations.

18. The computer-readable storage medium of claim 17, wherein solving the system of nonlinear equations involves using Gaussian Elimination.

19. An apparatus that computes interval parameter bounds from fallible measurements, comprising:

a receiving mechanism configured to receive a set of measurements $z_1, \ldots, z_n$, wherein an observation model describes each $z_i$ as a function of a p-element vector parameter $x=(x_1, \ldots, x_p)$, wherein receiving the set of measurements involves receiving values for a set of conditions $c_1, \ldots, c_n$ under which the corresponding observations $z_1$ were made, wherein equations in the system of nonlinear equations account for the conditions $c_i$ and are of the form $z_i - h(x|c_i) = 0$ ($i=1, \ldots, n$), and wherein each condition $c_1$ is not known precisely but is contained within an interval $c^I_i$;

a memory in a computer system for storing the set of measurements $z_1, \ldots, z_n$;

an equation forming mechanism configured to form a system of nonlinear equations $z_i - h(x) = 0$ ($i=1, \ldots, n$) based on the observation model; and a solver configured to solve the system of nonlinear equations to determine interval parameter bounds on x.

20. The apparatus of claim 19, wherein the system of nonlinear equations is an "overdetermined system" in which there are more equations than unknowns.

21. The apparatus of claim 19, wherein each measurement $z_i$ is actually a q-element vector of measurements $z_i = (z_{i1}, \ldots, z_{iq})^T$, and h is actually a q-element vector of functions $h = (h_1, \ldots, h_q)^T$.

22. The apparatus of claim 19, wherein each condition $c_i$ is actually an r-element vector of conditions $c_i = (c_{i1}, \ldots, c_{ir})^T$.

23. The apparatus of claim 19, wherein equations in the system of nonlinear equations are of the form $z_i - h(x|c_i) + \epsilon^I(x, c_i) = 0$ ($i=1, \ldots, n$), which includes an error model $\epsilon^I(x, c_i)$ that provides interval bounds on measurement errors for $z_i$.

24. The apparatus of claim 23, wherein if $z_i$ is actually a q-element vector of measurements $z_i = (z_{i1}, \ldots, z_{iq})^T$, then $\epsilon^I$ is actually a q-element vector $\epsilon^I = (\epsilon_1, \ldots, \epsilon_q)^T$.

25. The apparatus of claim 23, wherein if there exists no solution to the system of nonlinear equations, the solver is configured to determine that at least one of the following is true:

at least one of the set of measurements $z_i, \ldots, z_n$ is faulty;

the observation model $h(x|c_i)$ is false;

the error model $\epsilon^I(x, c_i)$ is false; and the computational system used to compute interval bounds on elements of x is flawed.

26. The apparatus of claim 19, wherein the solver is configured to:

linearize the system of nonlinear equations to form a corresponding system of linear equations; and to solve the system of linear equations.

27. The apparatus of claim 26, wherein the solver is configured to solve the system of nonlinear equations using Gaussian Elimination.

\* \* \* \* \*